(12) United States Patent
Edpalm et al.

(10) Patent No.: US 10,397,581 B2
(45) Date of Patent: Aug. 27, 2019

(54) METHOD AND RATE CONTROLLER FOR CONTROLLING OUTPUT BITRATE OF A VIDEO ENCODER

(71) Applicant: AXIS AB, Lund (SE)

(72) Inventors: Viktor Edpalm, Lund (SE); Alexander Toresson, Lund (SE); Alexandre Martins, Lund (SE)

(73) Assignee: Axis AB, Lund (SE)

( * ) Notice: Subject to any disclaimer, the term of this patent is extended or adjusted under 35 U.S.C. 154(b) by 1 day.

(21) Appl. No.: 15/960,176

(22) Filed: Apr. 23, 2018

(65) Prior Publication Data

US 2018/0309998 A1    Oct. 25, 2018

(30) Foreign Application Priority Data

Apr. 24, 2017 (EP) ..................... 17167732

(51) Int. Cl.
*H04N 19/146* (2014.01)
*H04N 19/40* (2014.01)
(Continued)

(52) U.S. Cl.
CPC ......... *H04N 19/146* (2014.11); *H04N 19/114* (2014.11); *H04N 19/124* (2014.11);
(Continued)

(58) Field of Classification Search
CPC .... H04N 19/146; H04N 19/61; H04N 19/179; H04N 19/114; H04N 19/124; H04N 19/40; H04N 19/169
See application file for complete search history.

(56) References Cited

U.S. PATENT DOCUMENTS 5,686,963 A    11/1997  Uz et al.
5,847,761 A    12/1998  Uz et al.
(Continued)

FOREIGN PATENT DOCUMENTS

CA    2137266         12/1994
EP    0802682 A1     10/1997
(Continued)

OTHER PUBLICATIONS

Extended European Search Report, European Application No. 17167732. 1, dated Jul. 12, 2017.
(Continued)

*Primary Examiner* — Nam D Pham
(74) *Attorney, Agent, or Firm* — Volpe and Koenig, P.C.

(57) ABSTRACT

A method of controlling output bitrate of a video encoder encoding a video sequence. The method comprises setting a long-term bit budget for a time period of at least one day for output of the video encoder, and determining a first allowable bitrate based on the long-term bit budget. The method further comprises determining an instantaneous bit restriction for output of the video encoder, and determining a second allowable bitrate based on the instantaneous bit restriction. Output bitrate is controlled based on the first allowable bitrate and the second allowable bitrate, such that the long-term bit budget, the first allowable bitrate and the second allowable bitrate are complied with. The method may be performed in a non-transitory computer-readable medium having instruction stored thereon. The method may also be performed by a bitrate controller. The bitrate controller may be found in a camera and a network video recorder.

16 Claims, 5 Drawing Sheets

(51) Int. Cl.
*H04N 19/124* (2014.01)
*H04N 19/61* (2014.01)
*H04N 19/114* (2014.01)
*H04N 19/179* (2014.01)
*H04N 19/169* (2014.01)

(52) U.S. Cl.
CPC ........... *H04N 19/179* (2014.11); *H04N 19/40* (2014.11); *H04N 19/61* (2014.11); *H04N 19/169* (2014.11)

(56) References Cited

U.S. PATENT DOCUMENTS

| | | | |
|---|---|---|---|
| 6,982,762 | B1 | 1/2006 | Hui |
| 7,496,142 | B2 | 2/2009 | Hui et al. |
| 9,083,971 | B2 | 7/2015 | Van Veldhuisen et al. |
| 9,215,467 | B2 | 12/2015 | Cheok et al. |
| 9,411,072 | B1 | 8/2016 | Dixon |
| 2002/0122482 | A1 | 9/2002 | Kim et al. |
| 2007/0040917 | A1* | 2/2007 | Kobayashi ........... H04N 19/197 348/222.1 |
| 2009/0086024 | A1 | 4/2009 | Brookins |
| 2013/0202031 | A1 | 8/2013 | Tripathi et al. |
| 2015/0358537 | A1 | 12/2015 | Mirza |

FOREIGN PATENT DOCUMENTS

| | | |
|---|---|---|
| JP | 2006197140 A2 | 7/2006 |
| JP | 2007251719 A2 | 9/2007 |
| JP | 2014180024 A2 | 9/2014 |
| WO | 16181150 A1 | 11/2016 |

OTHER PUBLICATIONS

Extended European Search Report, European Application No. 17167724.8, dated Nov. 2, 2017.

\* cited by examiner

METHOD AND RATE CONTROLLER FOR CONTROLLING OUTPUT BITRATE OF A VIDEO ENCODER

FIELD OF INVENTION

The present teachings relate to video encoding and more particularly to bitrate control of a video encoder.

BACKGROUND

In digital video systems, such as network camera monitoring systems, video sequences are compressed by an encoder before transmission, using various video encoding methods. In many cases, there is a limited bandwidth in a network over which the video sequences are to be transmitted, and therefore a rate controller is often used for controlling the output bitrate of the encoder.

Rate controllers may apply one of several bitrate control schemes. They may employ a constant bitrate (CBR), a maximum bitrate (MBR), or a variable bitrate (VBR). CBR means that the encoder will strive to always output the same bitrate, regardless of what happens in the captured scene. If bandwidth is limited, this may lead to low quality images when there is a motion in the scene, but high quality images when the image is static. In a surveillance or monitoring situation, this is generally not useful, as a scene with motion is normally of more interest than a static scene. With MBR, the bitrate is allowed to vary, as long as it does not exceed the bitrate limit set. The problems related to this approach are similar to the ones associated with CBR. If the MBR limit is set too low, images of a scene with motion may be of low quality. However, if the limit is set higher, in order to accommodate the motion, the output bitrate may be unnecessarily high when encoding images of a static scene. VBR may also be referred to as constant quality bitrate, meaning that the quality of the encoded images should be kept constant, but the output bitrate is allowed to vary depending on what is happening in the scene. This approach may lead to high output bitrate when there is motion in the scene. This is particularly problematic if bandwidth is limited, such as when transmitting encoded images over a mobile network. Similarly, it is problematic if storage is limited, such as when storing images on board the camera, e.g., on an SD card. High output bitrates may also be problematic in large systems of cameras if several cameras transmit images of scenes with motion simultaneously.

Another problem in digital video systems is that it is difficult to assess a need for storage capacity. If CBR is used, it is easy to estimate the needed storage capacity by simply multiplying the constant bitrate by a desired retention time. However, with MBR and VBR bitrate varies depending on what happens in the captured scene. The cost of storage is in many cases a significant part of the cost of a digital video system, and therefore system owners have a desire to keep storage capacity down. Still, this comes at a risk of losing recorded video, since the total amount of bits output over the desired retention time may be too large for the available storage capacity when there has been a lot of motion and details in the captured scene.

Hence, there is a need for an improved bitrate control method.

SUMMARY

An aim of the present disclosure is to provide a method for controlling output bitrate of a video encoder that makes it easier to predict a storage capacity need.

Another aim is to provide a method for controlling output bitrate of a video encoder that makes it possible to guarantee a predetermined retention time of stored video data.

It is also an aim to provide a bitrate controller that facilitates prediction of storage capacity need, and to provide a bitrate controller that enables ensuring a desired retention time for stored video data.

Yet another aim is to provide a camera and a network video recorder that enable improved bitrate control.

According to a first aspect, these and other objects are achieved, in full or at least in part, by a method of controlling output bitrate of a video encoder encoding a video sequence, the method comprising: setting a long-term bit budget for a time period of at least one day for output of the video encoder, determining a first allowable bitrate based on the long-term bit budget, determining an instantaneous bit restriction for output of the video encoder, determining a second allowable bitrate based on the instantaneous bit restriction; and controlling output bitrate based on the first allowable bitrate and the second allowable bitrate, such that the long-term bit budget, the first allowable bitrate and the second allowable bitrate are complied with. With such a method, it is possible to set a long-term bit budget that determines how many bits are allowed to be output over a long period of time. The long-term bit budget is set for a time period of at least one day, and may advantageously be set for a number of days, weeks, or months. By setting a long-term bit budget, it is possible to foresee the storage capacity that will be needed, making it easier to design a network camera system. The long-term bit budget also makes it possible to ensure that a predetermined retention time for stored video data can be maintained. By determining a first allowable bitrate based on the long-term bit budget, it is possible to control output bitrate over time, such that the end of the time period does not come with the unpleasant surprise that the long-term bit budget could not be met. Further, by determining a second allowable bitrate based on an instantaneous bit restriction, it is possible to control output bitrate such that, e.g., a bandwidth of a network over which the encoded video is to be transmitted is not exceeded. It should here be clarified that the term "complied with" as used herein means that the number of bits output during the time period for which the bit budget is set should be no higher than the long-term bit budget. Still, when it comes to the first and second allowable bitrate, these may be "complied with" even though they are temporarily exceeded. The first and second allowable bitrate are tools used for ensuring that the long-term bit budget is not exceeded. Thus, they are guiding values, such that if output bitrate is kept below these two allowable bitrates, the number of bits output during the time period for which the long-term bit budget is set will be below the bit budget, but as long as bitrate is not allowed to exceed the first and second allowable bit rates for too long, the long-term bit budget may still be respected. The first and second allowable bitrates could therefore be seen as "soft" bitrate limits, whereas the long-term bit budget is a "sharp" limit. In some variants of the inventive method, the first and/or second allowable bitrates may also be used as sharp limits.

According to some variants of the method, determining the first allowable bitrate comprises calculating an average bitrate by dividing the long-term bit budget by the time period. This is a straightforward way of determining the first allowable bitrate.

The step of controlling output bitrate based on the allowable bitrates may comprise after a first time interval, checking how many bits have been output during a first length of time, if the number of output bits during the first length of time is higher than the first allowable bitrate by a first margin, increasing a compression parameter of the encoder such that output bitrate is reduced for complying with the long-term bit budget; or if the number of output bits during the first length of time is lower than the first allowable bitrate by a second margin, decreasing a compression parameter of the encoder such that output bitrate is increased for increasing image quality within the long-term bit budget. In this manner, using a first allowable bitrate in the form of an average bitrate based on the long-term bit budget and the desired retention time, it is possible to increase compression if the need arises. If there has been a lot of activity in the scene for some time, more bits may have been output than allowed within the average bitrate. This may be compensated for by increasing compression for some time after that. On the other hand, if there has been little or no activity in the scene, there may be room for increased image quality for some time, and this can be achieved by decreasing compression. With this approach, it may be possible to use the available storage capacity efficiently.

According to some variants of the method, determining the first allowable bitrate comprises receiving input on historical variations of output bitrate of previously encoded video sequences. Historical data on bitrate variations may be useful for controlling the output bitrate of the encoder. In many locations, there are regularly occurring variations in activity in the scene. For instance, if a camera is mounted for monitoring outside the staff entrance of a factory building, there may be a lot of activity in the morning, at lunch, and in the afternoon, but less activity during working hours and during the night. With knowledge of such variations, it may be possible to allocate more bits to periods of more expected activity, and to use less bits during periods with less expected activity.

The previously encoded video sequences may have captured the same scene as the video sequence for which output bitrate is controlled. This may make the historical data more relevant for controlling future output bitrate than if generic historical data were used.

According to some variants of the method, controlling output bitrate based on the allowable bitrates comprises after a first time interval, checking how many bits have been output during a first length of time, if the number of output bits during the first length of time is higher than a historically expected number of bits by a third margin, increasing a compression parameter of the encoder such that output bitrate is reduced for complying with the long-term bit budget; or if the number of output bits during the first length of time is lower than the historically expected number of bits by a fourth margin, decreasing a compression parameter of the encoder such that output bitrate is increased for increasing image quality within the long-term bit budget. As already noted, taking historical bitrate variation data into account makes it possible to allocate bits to different time intervals depending on the expected variations in activity in the scene. Hereby, bits can be saved during periods when there is usually less activity, such that more bits can be spent on periods with more activity, which are generally of more interest for a user of the video sequence, and which benefit more from high image quality. If activity in the scene deviates from the historical pattern, it is possible to increase compression as the need arises and to decrease compression as the opportunity is presented.

Determining the second allowable bitrate may comprise receiving input on an available bandwidth of a network to which the encoder is connected for transmitting the encoded video sequence. In this way, the output bitrate of the encoder may be controlled such that it does not exceed the available bandwidth. Thus, it may be ensured that image frames of the video sequence can be transmitted over the network. The available bandwidth may be determined in various ways. For instance, for a single camera, the available bandwidth may be the bandwidth of a connection from the camera to a point of use of the video data, such as a video management system in a control centre. For a camera in a system of cameras, the available bandwidth may be an allocated portion of the total bandwidth of the network, with other portions of the total bandwidth being reserved for other cameras in the system. The network may be any kind of network. It may be wired or wireless, and it may for instance be a cellular network.

According to some variants of the method, controlling output bitrate based on the first allowable bitrate and the second allowable bitrate comprises limiting output bitrate to be lower than or equal to the second allowable bitrate. By not allowing the output bitrate to exceed the second allowable bitrate, it may be ensured that short-term bitrate restraints, such as available bandwidth, may at all times be complied with. It may be seen that in such variants of the method, the second allowable bitrate is used as a sharp limit. The second allowable bitrate may in such variants be imposed as an MBR.

Receiving input on the first allowable bitrate may comprise receiving input on an expected bitrate influencing event. In this manner, upcoming events may be taken into account when determining the first allowable bitrate, such that bits may be saved for later use if a potentially interesting event is expected. Conversely, bits may be put to better use before an expected period of less interesting activity.

Receiving input on the first allowable bitrate may comprise receiving user input. A user may, for instance allow a higher first allowable bitrate if a new, larger disk drive is starting to be used for storage of video data. Similarly, the user may decide a longer retention time is necessary, for instance if a crime has occurred, and recorded video sequences possibly containing forensically important data need to be stored longer.

According to a second aspect, these and other objects are achieved, in full or at least in part, by a bitrate controller for controlling output bitrate of a video encoder encoding a video sequence, the bitrate controller comprising: a budget setter arranged to set a long-term bit budget for a time period of at least one day for output of the video encoder, a bit restriction determinator arranged to determine an instantaneous bit restriction for output of the video encoder, a bitrate determinator arranged to determine a first allowable bitrate based on the long-term bit budget, and to determine a second allowable bitrate based on the instantaneous bit restriction; a bitrate calculator arranged to calculate an output bitrate based on the first and second allowable bitrates; and a control output arranged to output the calculated output bitrate to the video encoder. With such a bitrate controller it is possible to ensure that output bitrate of the encoder complies with an instantaneous bit restriction, such as an available transmission bandwidth, as well as a long-term bit budget based, e.g., on a desired retention time for stored video data. The bitrate controller of the second aspect may be embodied in essentially the same ways as the method of the first aspect, with accompanying advantages.

According to a third aspect, these and other objects are achieved, in full or at least in part, by computer program product comprising a non-transitory computer-readable storage medium with instructions adapted to carry out the method according to the first aspect when executed by a processor. Using such a computer program product, it may be possible to control bitrate such that short-term as well as long-term output bitrate limitations are met. The computer program product of the third aspect may be varied generally in the same ways as the method of the first aspect, with accompanying advantages.

According to a fourth aspect, these and other objects are achieved, in full or at least in part, by camera comprising a bitrate controller according to the second aspect. By integrating such a bitrate controller in a camera, it is possible to achieve the advantages of the bitrate controller of the second aspect locally in the camera.

According to a fifth aspect, these and other objects are achieved, in full or at least in part, by network video recorder comprising a bitrate controller according to the second aspect. The inclusion of a bitrate controller of the second aspect makes it possible, for instance, to control output bitrate from a number of video encoders, included in cameras in a networked system of cameras. Hereby, a long-term bit budget may be set for the whole system of cameras, rather than for each camera separately, enabling better use of storage capacity in the network video recorder.

A further scope of applicability of the present teachings will become apparent from the detailed description given below. However, it should be understood that the detailed description and specific examples, while indicating embodiments of the teachings, are given by way of illustration only, since various changes and modifications within the scope of the present teachings will become apparent to those skilled in the art from this detailed description.

Hence, it is to be understood that the present teachings are not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, a reference to "an object" or "the object" may include several objects, and the like. Furthermore, the word "comprising" does not exclude other elements or steps.

BRIEF DESCRIPTION OF THE DRAWINGS

A more detailed understanding may be had from the following description, given by way of example in conjunction with the accompanying drawings where.

DETAILED DESCRIPTION

Figure 1:
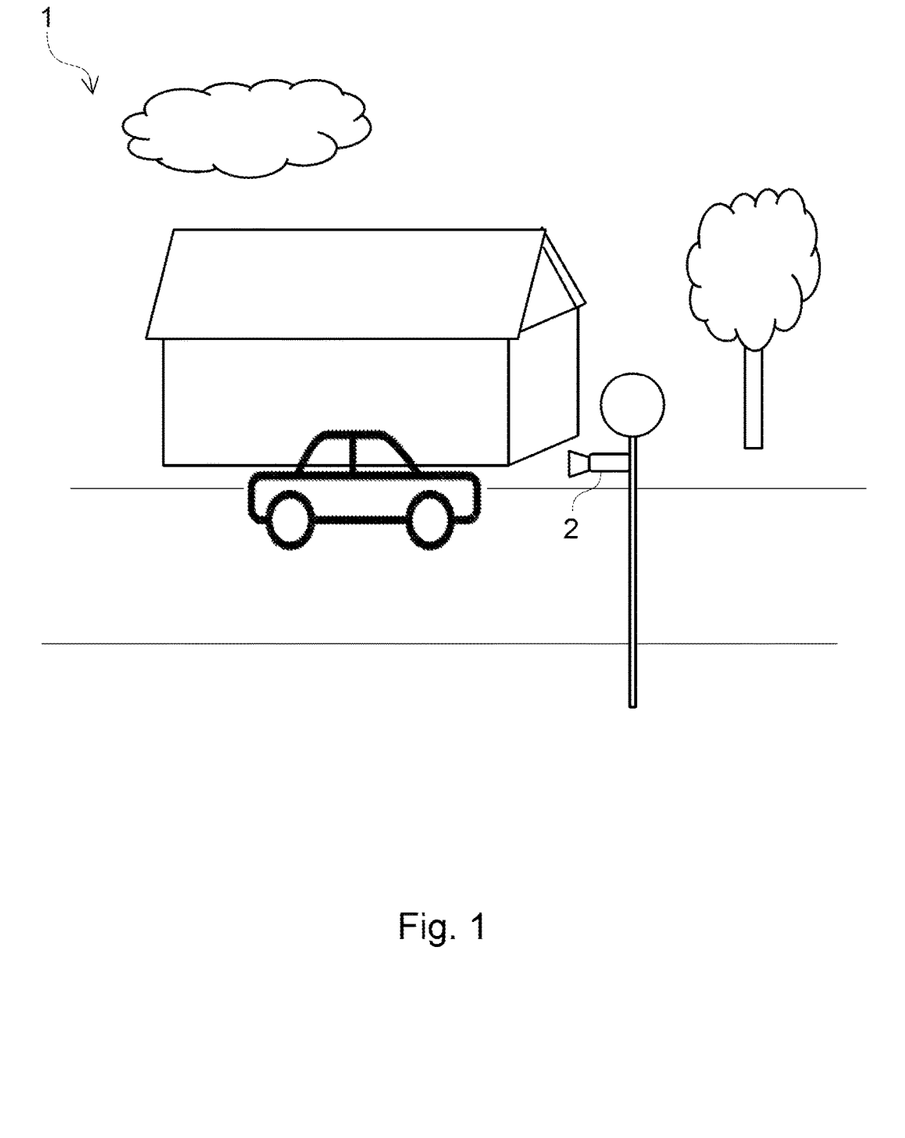
FIG. 1 is a perspective view of a scene monitored by a camera.
Figure 2:
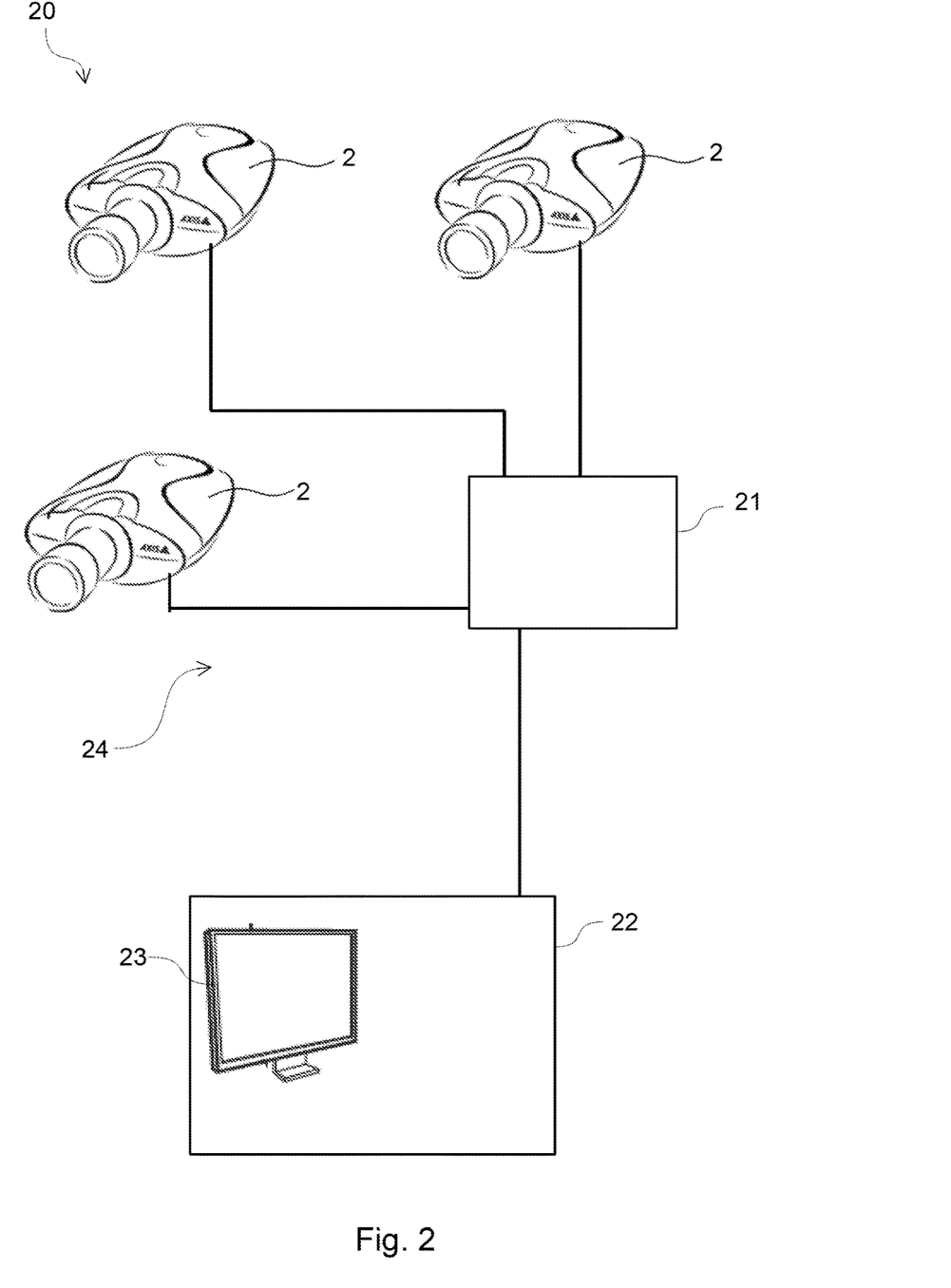
FIG. 2 is a diagram of a camera system.

In FIG. 1, a scene 1 is shown, which is monitored by a camera 2. FIG. 2 shows a camera system 20, of which the camera 2 in FIG. 1 is a part. The camera system 20 comprises a number of cameras 2, a network video recorder 21, and a user station 22 including a display 23. The camera system 20 further comprises a network 24 connecting the cameras 2 to the network video recorder 21 and also connecting the cameras 2, and the network video recorder 21 to the user station 22. The network 24 may be wired or wireless, and it may, e.g., be a cellular network. Different parts of the network may use the same or different network technologies. For instance, the cameras 2 may be connected to the network video recorder 21 using wires, and the connection to the user station may be wireless. In some use cases, the user station 22 may be arranged geographically close to the cameras 2 and the network video recorder 21, e.g., in the same building. In other use cases, the user station 22 may be arranged remotely. In some cases, the camera system is geographically spread, such that one or more cameras are arranged in one location, such as a shop in one town, while one or more other cameras are located elsewhere, such as in another shop in another town. The user station 22 may be a physical device or system of devices. For instance, the user station 22 may be a PC with a display, located in a control centre where an operator may watch captured video sequences in real time or from recordings. Alternatively, or additionally, the user station may be a mobile device, such as a smartphone.

Figure 3:
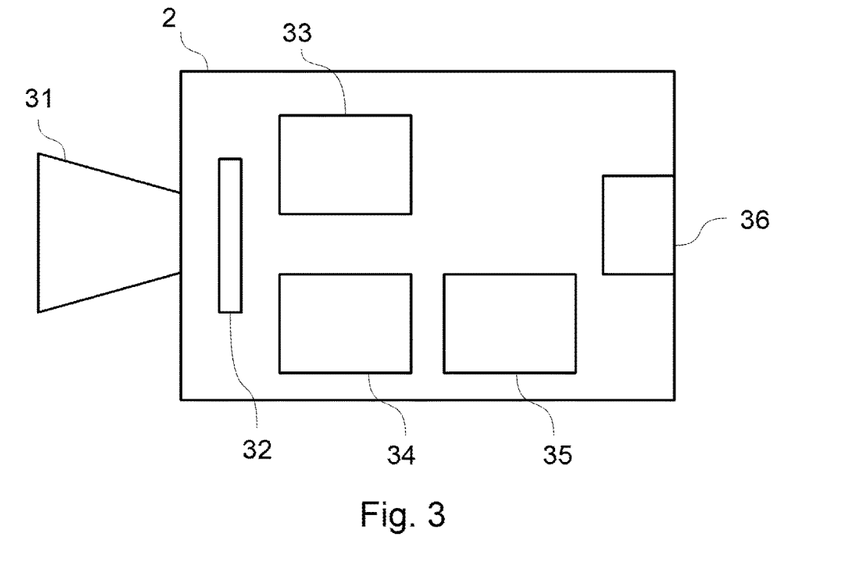
FIG. 3 is a block diagram of a camera in the system of FIG. 2.

In FIG. 3, a simplified block diagram of the camera 2 is shown. The camera 2 has a lens 31, an image sensor 32, a bitrate controller 33, an encoder 34, a local storage 35, and a network interface 36. As will be appreciated by the skilled person, the camera 2 has additional components, but as these are not necessary for the explanation of the present teachings, they are not included in the drawings, and will not be further discussed. By means of the lens 31 and the image sensor 32, the camera 2 captures images of the scene 1. The images are encoded by the encoder 34 to form a stream of encoded image frames. The bitrate controller 33 controls the output bitrate of the encoder 34, as will be explained in more detail later. The local storage 35 may, e.g., be an SD card, and may be used for storing encoded image frames locally in the camera. By means of the network interface 36, the camera 2 may transmit encoded image frames to the network video recorder 21 and/or to the user station 22.

Figure 4:
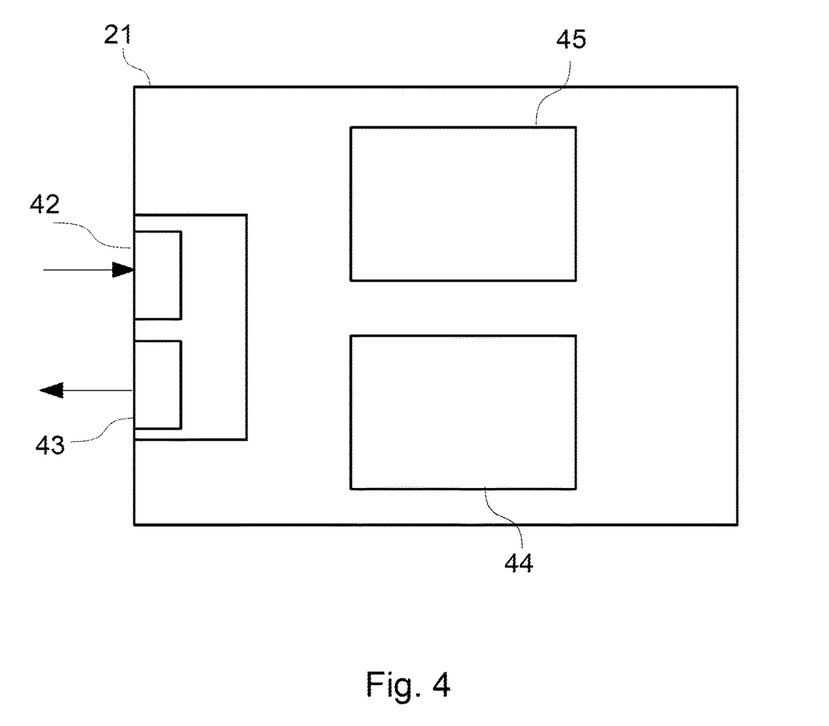
FIG. 4 is a block diagram of a network video recorder in the system of FIG. 2.

In FIG. 4, a simplified box diagram of the network video recorder 21 is shown. The network video recorder 21 has a network interface 41 with an input 42 for connection to the cameras 2 in the camera system 20, and an output 43 for connection to the user station 22. Further, the network video recorder 21 has a storage unit 44 and a bitrate controller 45. The storage unit 44 may, for instance, be a disk drive. As with the bitrate controller 33 of the camera 2, the function of the bitrate controller 45 of the network video recorder will be described further later on. The network video recorder 21 may have other components as well, but as these are not necessary for explaining the present teachings, they are not shown in the drawing and will not be further discussed.

Figure 5:
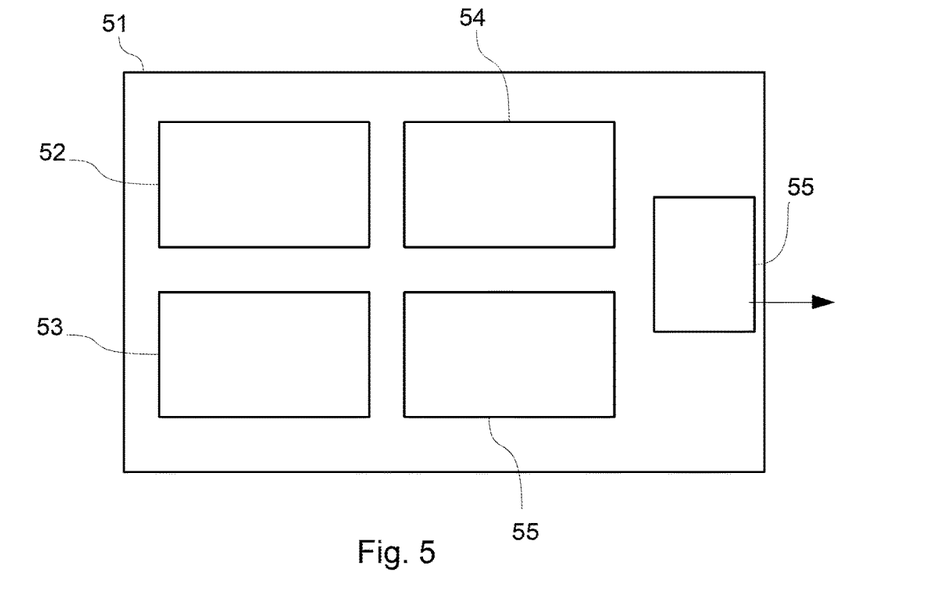
FIG. 5 is a block diagram of a bitrate controller in the system of FIG. 2.

In FIG. 5, a simplified box diagram of a bitrate controller 51 is shown. The bitrate controller 51 may be a standalone unit, connectable to the camera 2 and/or the network video recorder 21. Alternatively, the bitrate controller 51 may be integrated in the camera 2, thereby taking the place of the bitrate controller 33 shown in FIG. 3, or it may be integrated in the network video recorder 21, thereby taking the place of the bitrate controller 45 shown in FIG. 4. Regardless of where the bitrate controller 51 is arranged, it may have essentially the same components and work in essentially the same way. Thus, the following description of the bitrate controller 51 shown in FIG. 5 is valid also for the bitrate controller 33 shown in FIG. 3 and the bitrate controller 45 shown in FIG. 4.

The bitrate controller 51 has a budget setter 52, which is arranged to set a long-term bit budget. The long-term bit budget sets a limit to the number of bits that may be output over a time period of at least one day by the video encoder that is controlled by the bitrate controller 51. Such a video encoder may be integrated in a camera, such as the encoder 34 shown in FIG. 3. However, such a video encoder may also be arranged in various other ways. For instance, it may be a separate unit operatively connected to a camera, or it may be included in a network video recorder, such as the network video recorder 21 shown in FIG. 4. In a network video recorder, a video encoder could be used for transcoding video data. Thus, encoded image frames may be received from one or more cameras, decoded in the encoder of the network video recorder, and once more encoded before storage in the network video recorder or transmission to a user station. An encoder for transcoding could also be arranged in or at the user station.

The bitrate controller 51 further comprises a bit restriction determinator 53, which is configured to determine an instantaneous bit restriction for output of the video encoder. The instantaneous bit restriction applies to a significantly shorter time period than the long-term bit budget, and may for instance be the available bandwidth for transmission from the video encoder. In some applications, the instantaneous bit restriction is strict, e.g., such as when it is not possible to transmit image frames of a size above the instantaneous bit restriction. In other applications, the instantaneous bit restriction may be more flexible, e.g., such as when several cameras share a network bandwidth and each camera is allotted a nominal portion of the network bandwidth. In such situations, it may be possible for image frames to be transmitted from the video encoder, even though the size of a transmitted image frame exceeds the nominal portion of the network bandwidth, as long as other cameras in the system are not using their full nominal share of the bandwidth.

Additionally, the bitrate controller 51 includes a bitrate determinator 54. The bitrate determinator is configured to determine a first allowable bitrate based on the long-term bit budget. The first allowable bitrate sets a limit to the output bitrate of the video encoder which ensures that the long-term bit budget will be respected. The bitrate determinator 54 is also configured to determine a second allowable bitrate based on the instantaneous bit restriction. The second allowable sets a limit to the output bitrate of the video encoder which ensures that the instantaneous bit restriction will be respected.

The bitrate controller 51 further comprises a bitrate calculator 55. The bitrate calculator 55 is configured to calculate an output bitrate based on the first allowable bitrate and the second allowable bitrate. Thus, the bitrate calculator 55 calculates an output bitrate that is to be met by the video encoder, and that takes into account the long-term bit budget, the first allowable bitrate, and the second allowable bitrate. In order to ensure compliance with the long-term bit budget, at each point in time, the lowest one of the first and second allowable bitrates will be decisive for what output bitrate is calculated. A control output 56 of the bitrate controller 51 is configured to output the calculated output bitrate to the video encoder. In this manner, the video encoder can be instructed with an output bitrate it is allowed to use in order to ensure that the long-term bit budget is respected, such that a desired retention time may be guaranteed, and in order to ensure that shorter-term restrictions on bitrate, such as available bandwidth, are also respected, such that transmission of encoded image frames is possible at all times. As will be discussed further below, the output bitrate may be recalculated at regular (or possibly irregular) intervals, such that control of the video encoder may be dynamic.

The bitrate controller 51 may be embodied in hardware, firmware, software, or any combination thereof.

Figure 6:
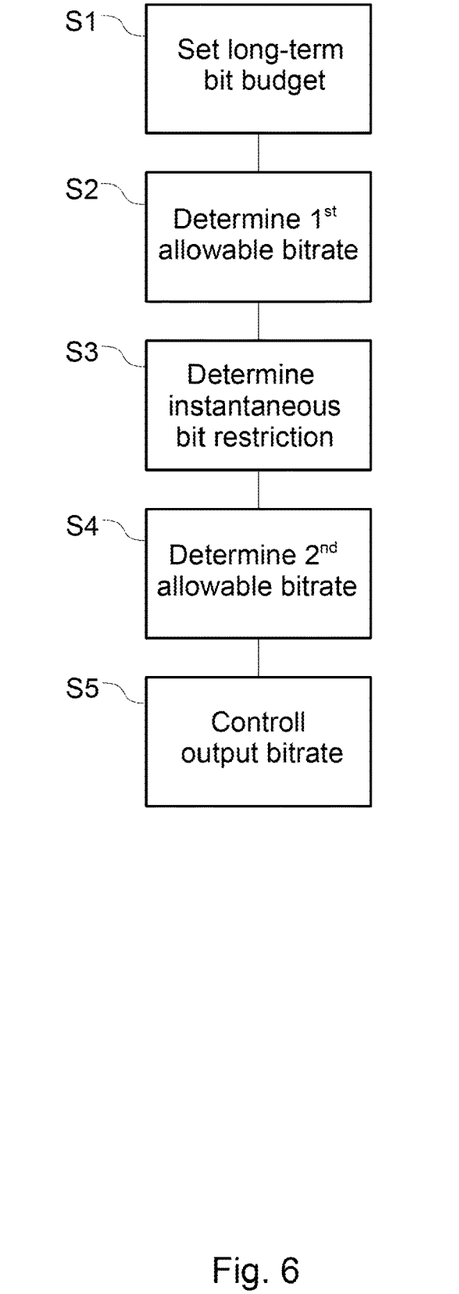
FIG. 6 is a flow chart of a method of controlling output bitrate of a video encoder.

In FIG. 6, a flow chart of an example of a method of controlling output bitrate of a video encoder is shown. This method may, for instance, be performed in the bitrate controller 51 shown in FIG. 5.

In the example shown, a long-term bit budget is set (step S1). The long-term bit budget specifies how many bits are allowed to be output by the video encoder during a time period of at least one day. The long-term bit budget may, for instance, be set based on available storage capacity. A first allowable bit rate is determined (S2). This may be done in different ways. A simple approach is to decide on a desired retention time for stored video data, and to divide the long-term bit budget by that retention time. With this approach, an allowable average bitrate is determined. The first allowable bitrate may be set as the simple average, but using a safety margin, such that, e.g., 90% of the long-term bit budget is divided by the time period, and the remaining 10% are left as a safety margin for possible adjustments at the end of the time period. A slightly more complex approach using historical data will be described later on. The first allowable bitrate may be expressed in different ways, depending on what input the video encoder accepts. For instance, the first allowable bitrate may be expressed as a number of bits per second.

An instantaneous bit restriction is also determined (S3). The instantaneous bit restriction may, e.g., correspond to an available bandwidth of the network to which the encoder is connected for transmitting the encoded image frames. The available bandwidth may be an allotted portion of a total bandwidth shared by a number of cameras in a camera system, such as the camera system 20 shown in FIG. 2. The instantaneous bit restriction may be static, or it may vary dynamically, e.g., because other cameras in the camera system use varying amounts of the total bandwidth.

A second allowable bitrate is determined (S4) based on the instantaneous bit restriction. Thus, the second allowable bitrate may simply be the available bandwidth per unit of time. A user may also choose, for various reasons, to set a lower second allowable bitrate. It should be borne in mind that if a higher second allowable bitrate were to be set, this would mean that at times it may not be possible to transmit encoded image frames from the encoder because the capacity of the network is exceeded. Like the first allowable bitrate, the second allowable bitrate may be expressed in various ways, e.g., as a number of bits per second.

Having determined the long-term bit budget, the first allowable bitrate and the second allowable bitrate, output bitrate of the video encoder is controlled (S5) such that the long-term bit budget, the first allowable bitrate, and the second allowable bitrate are complied with. As already mentioned in the summary above, depending on how the first allowable bitrate and the second allowable bitrate have been determined, complying with them need not mean that output bitrate has to be below the first and second allowable bitrates at all times. For instance, the first and second allowable bitrates may have been determined with a safety margin, such that the output bitrate is allowed to exceed one or both of them for short periods of time. Most of the time, one of the first and second allowable bitrates will be the actual limiting factor. Thus, the calculated output bitrate will at each point in time be determined by the lowest one of the first and second allowable bitrates. For example, in a camera system with limited network bandwidth, e.g., using a cellular network, the limiting factor may be the available bandwidth, such that if output bitrate is kept below the second allowable bitrate, the available storage capacity will always be sufficient for the desired retention time. In other camera systems, the available storage capacity may instead be the limiting factor, such that if output bitrate were to stay at or just slightly below the second allowable bitrate, the available storage would be filled up faster than the desired retention time, leading to over-writing and loss of video data.

At regular, or possibly irregular, time intervals, it may be checked how many bits have been output during a predetermined length of time. The time interval and the length of time may be chosen in relation to the time period for which the long-term bit budget has been set. For instance, if a retention time of 60 days is desired, the long-term bit budget may be set as the capacity of available storage. Checks of the number of output bits may be made at a time interval of, e.g., an hour, and the length of time for which the check is made may be, e.g., a day. As another example, a time interval of a day may be used and the studied length of time may be 60 days. In either way, these checks are made with a sliding window of time. At each check, the number of bits output by the encoder during the latest length of time is checked.

By way of example, a long-term bit budget has been set for a time period of 30 days. At some point in time, after a first time interval of one day, a check is made of how many bits have been output by the video encoder during a first length of time of 30 days. If it is found that the number of output bits is higher than the first allowable bitrate by a first margin, this means that there is a risk that the long-term bit budget will not be complied with. Therefore, the bitrate controller instructs the video encoder to increase a compression parameter, such that output bitrate of the video encoder will decrease. Depending on the video encoder, there may be different compression parameters that can be controlled. One common compression parameter is the quantization parameter, which determines the number of quantization steps used for mapping pixel values in input images to quantization levels in the encoded image frames. Increasing the quantization parameter generally leads to decreased bitrate and also decreased image quality. Other compression parameters that may in some encoders be controlled are pixel block size, image resolution, GOP length, and frame rate. By increasing the compression parameter, output bitrate may thereafter be reduced such that the long-term bit budget is complied with. The first margin may be chosen such that unnecessary oscillation caused by too frequent changes in compression parameters is avoided. If desired, the first margin could be set to zero, such that any deviation above the first allowable bitrate will be countered by an increased compression. One way of determining by how much the compression parameter should be increased is to study the number of bits output during the first length of time and to calculate which value of the compression parameter would have made the number of bits end up below the first allowable bitrate. This calculated value of the compression parameter may then be used for encoding subsequent image frames.

If, instead, it is found that the number of output bits is below the first allowable bitrate by a second margin, this means that the long-term bit budget is being complied with, but that there may be room for higher image quality. Therefore, a compression parameter is decreased, such that output bitrate is increased, thereby allowing higher image quality within the long-term bit budget. The second margin may be the same as the first margin, or it may be different.

If it is found that the number of output bits is neither higher nor lower than the first allowable bitrate, the compression parameters of the video encoder may be left unaltered.

Checks may be made repeatedly, at regular or irregular intervals, such that the output bitrate the video encoder is allowed is dynamically recalculated.

As already discussed above, sometimes the first allowable bitrate will be limiting and sometimes the second allowable bitrate will be limiting. The output bitrate of the video encoder may therefore be controlled such that it at all times is below or equal to the second allowable bitrate. It may here be pointed out that in situations where the first allowable bitrate is limiting, it will not suffice to keep output bitrate below the second allowable bitrate. In such situations output bitrate will have to be kept at or below the first allowable bitrate, too.

It should be noted that although the time interval is referred to as a first time interval, it need not be the very first day or week, etc., of the performance of the bitrate control method. The "first time interval" is called "first" simply as way of being able to easily refer to it in the claims and this description. The check may be repeated at regular intervals in the same way as for the first time interval. Similarly, the "first length of time" is called "first" just for convenience of the claims and this description. Naturally, when the encoder is first started, checks each day for a long-term bit budget set for a period of a month will most certainly at first give the result that the number of bits output during the last month is below the budget, since before start-up there were zero bits output, and therefore the results at start-up will not be reliable. This problem may be remedied by using a shorter length of time for the check. For example, even though the long-term bit budget has been set for a time period of a month, the length of time studied in the check may be, e.g., a week or a day. Further, after the method has been running for some time, there will be a sufficiently long time of operation before each check, such that the whole studied length of time contains actual output bit data.

As noted above, calculating the first allowable bitrate as an average bitrate by dividing the long-term bit budget by the time period for which the budget has been set is a simple and straightforward approach. Still, such an approach does not take into account that in most monitoring scenarios, activity in the scene will vary with time. In some scenarios, activity varies according to a more or less regular pattern. For instance, as discussed above, there may be a lot of activity at certain times of the day. There may also be more activity certain days, such as work days, and less activity on other days, such as weekends. Knowledge of such variations may be used to advantage in variants of the inventive method. Therefore, the determination of the first allowable bitrate may include receiving input on historical variations of output bitrate of previously encoded video sequences. Preferably, the previously encoded video sequences captured the same scene as the video sequences for which output bitrate is to be controlled. However, it may also be possible to use generic data taken from previously encoded video sequences capturing another, preferably similar, scene. Generic historical data may be easier to obtain, but may be a less reliable input for determining the first allowable bitrate.

With the help of historical bitrate variations, it may be possible to control output bitrate more dynamically and proactively than if a simple bitrate average is used as first allowable bitrate. If it is known that there is usually little activity during certain hours of the day or certain days of the week, more bits can be allocated to times of expected activity, and less bits can be spent on images of a static scene. Checks of the number of output bits are made in essentially the same way as discussed above. Thus, after a first time interval, it is checked how many bits have been output during a first length of time. In the same way as for the simple average bitrate, a sliding window of time is used. If the number of bits output during the first length of time is above a historically expected number of bits by a third margin, the bitrate controller instructs the video encoder to increase a compression parameter, such that output bitrate is reduced. In this way, the long-term bit budget may be complied with. Conversely, if the number of bits output during the first length of time is below the historically expected number by a fourth margin, the bitrate controller instructs the video encoder to decrease a compression parameter, such that output bitrate is increased. Hereby, image quality may be increased within the long-term bit budget. It may here be noted that the third and fourth margins serve the same purpose as the first and second margins mentioned above.

Sometimes it is useful for a user to be able to make input for determining the first allowable bitrate. One such case is when available storage capacity changes. For instance, one disk drive in a set of disk drives may have broken down, such that the available storage capacity is decreased, or a new larger disk drive may have been procured, such that available storage capacity is increased. The bitrate controller may be configured to receive such user input. The bitrate controller may also be configured to receive input on an expected bitrate influencing event. For example, a carnival may be planned, which may be expected to cause increased bitrate. In order to account for such an event, the video encoder may be controlled to reduce output bitrate for some time in preparation for the upcoming event, such that bits may be saved for use during the event. Similarly, something may have happened that makes it necessary to increase retention time for stored video data, such that the first allowable bitrate needs to be decreased for complying with the long-term bit budget. This may, for instance, happen when a crime has occurred, and video data has to be stored for a longer time to be available for forensic use.

It may turn out that output bitrate from the encoder oscillates with a period generally corresponding to the length of time for which the checks of the number of output bitrate are made. In order to avoid or at least reduce such oscillations, it may be advantageous to make the checks for more than one length of time. For instance, a first length of time of 30 days may be checked, as well as a second length of time of 15 days. Further reduction of the oscillations may be achieved by using lengths of time that are not multiples of each other, e.g., a first length of time of 30 days and a second length of time of 13 days.

The inventive method may be performed with the help of a computer program. The computer program may be stored on a non-transitory computer-readable storage medium, and it may comprise instructions adapted to carry out the method when executed by a device with processing capability.

It will be appreciated that a person skilled in the art can modify the above described embodiments in many ways and still use the advantages of the present teachings as shown in the embodiments above. As an example, above, the bitrate controller has been described as being integrated in a camera or a network video recorder, but it may as well be arranged as a separate unit and be operatively connected to a camera, a system of cameras, or a network video recorder.

Further, the bitrate controller has been described as being arranged in either the camera or the network video recorder. It may in some applications be beneficial to divide the functions of the bitrate controller, such that the bitrate control based on the second allowable bitrate is performed in or at each camera in the camera system, and such that bitrate control based on the long-term bit budget and the first allowable bitrate is performed in or at the network video recorder.

It should be noted that although the camera and the network video recorder have both been described as including a bitrate controller, it may be possible to dispense with it in either the camera or the network video recorder. If bitrate control is performed locally in each camera, based on the first allowable bitrate and the second allowable bitrate, it is not necessary to include a bitrate controller in the network video recorder. Analogously, it may not be necessary to have a bitrate controller in the camera if the full bitrate control method is performed in the network video recorder. Similarly, if a separate bitrate controller is used, neither the camera nor the network video recorder need include a bitrate controller.

The images encoded by the encoder may be received directly from the capturing camera, or they may have been captured earlier and stored before they are transmitted to the image processing unit. Thus, the immediate source of the images may be an image sensor or a data file.

The camera may be any kind of camera, such as a camera employing visible light, a camera employing NIR (near infrared) radiation, or a thermal camera.

The camera is advantageously a digital camera, but it may instead be an analogue camera connected to a digitalization unit.

The present disclosure has been described in the context of monitoring cameras, sometimes referred to as surveillance cameras, but it may be used to advantage also in other camera applications.

The network video recorder has been described as a physical device, but it may instead be a cloud service.

Although the camera system has been shown as including a network video recorder, it is entirely possible to arrange a camera system without a network video recorder. In such a system, storage may occur locally in the cameras and/or remotely, such as in a control centre.

The camera 2 shown in the drawings and discussed above includes a local storage 35. In some camera systems, the local storage may be the only storage, and in others it may be used for backup and redundancy, with storage also occurring in the network video recorder or on a storage device in or at the user station. For instance, servers may be arranged for storage in a control centre. In some camera systems, nu local storage is included in the cameras, and only the network video recorder or other external storage is used.

Recording or storage of video may be performed continuously, but in many cases it is advantageous to store video only when triggered by an event, such as video motion detection or input from an alarm device, such as a PIR sensor. In this way, storage capacity may be saved by storing only potentially interesting video sequences and not storing video when nothing is happening in the scene.

Encoded image frames may be continuously transmitted to the user station, but also this may be limited by event triggering. In some video systems, encoded image frames may be continuously transmitted to a control centre, for storage and/or immediate viewing by an operator, and it may additionally be transmitted to a mobile device only based on event triggering, such that a user may be alerted when something happens in the scene.

The local storage in the camera may be used for so called failover recording. This means that if encoded image frames are normally continuously transmitted from the camera, local storing may commence if connection to the network is lost. Once network connection is restored, the video data stored in the local storage may be transmitted to the user station, and a complete video sequence may be restored.

Above, the encoder has been described as being part of a camera. However, it may instead be a separate unit, operatively connected to the camera.

The encoder may operate in accordance with any encoding standard employing motion estimation and motion compensation. The encoder may, for instance be a block-based hybrid encoder, such as an H.264, H.265, or VP9 encoder.

The inventive method may be performed by executing instructions stored on a computer-readable, non-transitory storage medium. The instructions may be executed by any device having processing capability, such as a central processing unit (CPU), a graphics processing unit (GPU), a custom made processing device implemented in an integrated circuit, an ASIC, an FPGA, or logical circuitry including discrete components.

The present teachings have been described in the context of ensuring a desired retention time for video data. However, it may be used also to other ends. For instance, the method and bitrate controller may be used for controlling shifts in transmission in order to distribute peaks in bitrate from several cameras in a system, where the cameras have a limited bandwidth for transmitting encoded image frames. In such a situation, a "long-term" bit budget could be set for, e.g., an hour, corresponding to the available bandwidth multiplied by an hour, and the different cameras could be controlled such that some of them wait while others transmit, thereby sharing the available "long-term" bit budget between them.

Although different embodiments and variants have been described above, they should not be seen as isolated, but the features thereof may be freely combined.

Thus, the present teachings should not be limited to the shown embodiments but should only be defined by the appended claims.

What is claimed is:

1. A method of controlling output bitrate of a video encoder encoding a video sequence, the method comprising:
setting a long-term bit budget for a time period of at least one day for output of the video encoder;
determining a first allowable bitrate based on the long-term bit budget;
determining an instantaneous bit restriction for output of the video encoder;
determining a second allowable bitrate based on the instantaneous bit restriction; and
controlling output bitrate based on the first allowable bitrate and the second allowable bitrate, such that the long-term bit budget, the first allowable bitrate and the second allowable bitrate are complied with.

2. The method according to claim 1, wherein determining the first allowable bitrate comprises calculating an average bitrate by dividing the long-term bit budget by the time period.

3. The method according to claim 2, wherein controlling output bitrate based on the allowable bitrates comprises:
after a first time interval, checking how many bits have been output during a first length of time; and
increasing a compression parameter of the encoder such that output bitrate is reduced for complying with the long-term bit budget in response to the number of output bits during the first length of time is higher than the first allowable bitrate by a first margin.

4. The method according to claim 2, wherein controlling output bitrate based on the allowable bitrates comprises:
after a first time interval, checking how many bits have been output during a first length of time; and
decreasing a compression parameter of the encoder such that output bitrate is increased for increasing image quality within the long-term bit budget in response to the number of output bits during the first length of time is lower than the first allowable bitrate by a second margin.

5. The method according to claim 1, wherein determining the first allowable bitrate comprises receiving input on historical variations of output bitrate of previously encoded video sequences.

6. The method according to claim 5, wherein the previously encoded video sequences captured the same scene as the video sequence for which output bitrate is controlled.

7. The method according to claim 5, wherein controlling output bitrate based on the allowable bitrates comprises:
after a first time interval, checking how many bits have been output during a first length of time; and
increasing a compression parameter of the encoder such that output bitrate is reduced for complying with the long-term bit budget in response to the number of output bits during the first length of time is higher than a historically expected number of bits by a third margin.

8. The method according to claim 5, wherein controlling output bitrate based on the allowable bitrates comprises:
after a first time interval, checking how many bits have been output during a first length of time; and
decreasing a compression parameter of the encoder such that output bitrate is increased for increasing image quality within the long-term bit budget in response to the number of output bits during the first length of time is lower than the historically expected number of bits by a fourth margin.

9. The method according to claim 1, wherein determining the second allowable bitrate comprises receiving input on an available bandwidth of a network to which the encoder is connected for transmitting the encoded video sequence.

10. The method according to claim 1, wherein controlling output bitrate based on the first allowable bitrate and the second allowable bitrate comprises limiting output bitrate to be lower than or equal to the second allowable bitrate.

11. The method according to claim 1, wherein receiving input on the first allowable bitrate comprises receiving input on an expected bitrate influencing event.

12. The method according to claim 1, wherein receiving input on the first allowable bitrate comprises receiving user input.

13. A bitrate controller for controlling output bitrate of a video encoder encoding a video sequence, the bitrate controller comprising:
a budget setter arranged to set a long-term bit budget for a time period of at least one day for output of the video encoder;

a bit restriction determinator arranged to determine an instantaneous bit restriction for output of the video encoder;
a bitrate determinator arranged to determine a first allowable bitrate based on the long-term bit budget, and to determine a second allowable bitrate based on the instantaneous bit restriction;
a bitrate calculator arranged to calculate an output bitrate based on the first and second allowable bitrates; and
a control output arranged to output the calculated output bitrate to the video encoder.

14. A non-transitory computer-readable medium having instructions stored thereon for controlling output bitrate of a video encoder encoding a video sequence, execution of which by a computing device causes the computing device to perform operations comprising:
   setting a long-term bit budget for a time period of at least one day for output of the video encoder;
   determining a first allowable bitrate based on the long-term bit budget;
   determining an instantaneous bit restriction for output of the video encoder;
   determining a second allowable bitrate based on the instantaneous bit restriction; and
   controlling output bitrate based on the first allowable bitrate and the second allowable bitrate, such that the long-term bit budget, the first allowable bitrate and the second allowable bitrate are complied with.

15. A camera comprising:
an image sensor configured to capture images;
an encoder configured to encode the images; and
a bitrate controller configured to control an output bitrate of the encoder encoding a video sequence, the bitrate controller comprising:
   a budget setter arranged to set a long-term bit budget for a time period of at least one day for output of the video encoder;
   a bit restriction determinator arranged to determine an instantaneous bit restriction for output of the video encoder;
   a bitrate determinator arranged to determine a first allowable bitrate based on the long-term bit budget, and to determine a second allowable bitrate based on the instantaneous bit restriction;
   a bitrate calculator arranged to calculate an output bitrate based on the first and second allowable bitrates; and
   a control output arranged to output the calculated output bitrate to the video encoder.

16. A network video recorder comprising:
a bitrate controller for controlling output bitrate of a video encoder encoding a video sequence, the bitrate controller comprising:
   a budget setter arranged to set a long-term bit budget for a time period of at least one day for output of the video encoder;
   a bit restriction determinator arranged to determine an instantaneous bit restriction for output of the video encoder;
   a bitrate determinator arranged to determine a first allowable bitrate based on the long-term bit budget, and to determine a second allowable bitrate based on the instantaneous bit restriction;
   a bitrate calculator arranged to calculate an output bitrate based on the first and second allowable bitrates; and
   a control output arranged to output the calculated output bitrate to the video encoder.

\* \* \* \* \*